(12) United States Patent
Ito

(10) Patent No.: US 10,855,956 B2
(45) Date of Patent: Dec. 1, 2020

(54) SYSTEM AND METHOD FOR INSPECTING INTERIOR OF STRUCTURE

(71) Applicants: Japan Airlines Co., Ltd., Tokyo (JP); JAL Engineering Co., Ltd., Tokyo (JP)

(72) Inventor: Naofumi Ito, Tokyo (JP)

(73) Assignees: JAPAN AIRLINES CO., LTD., Tokyo (JP); JAL ENGINEERING CO., LTD., Tokyo (JP)

( * ) Notice: Subject to any disclaimer, the term of this patent is extended or adjusted under 35 U.S.C. 154(b) by 0 days.

(21) Appl. No.: 16/563,066

(22) Filed: Sep. 6, 2019

(65) Prior Publication Data

US 2020/0084420 A1 Mar. 12, 2020

(30) Foreign Application Priority Data

Sep. 7, 2018 (JP) ................................. 2018-167948

(51) Int. Cl.
*H04N 7/18* (2006.01)
*H04N 5/232* (2006.01)
*H04N 5/265* (2006.01)

(52) U.S. Cl.
CPC ......... *H04N 7/183* (2013.01); *H04N 5/23238* (2013.01); *H04N 5/265* (2013.01)

(58) Field of Classification Search
CPC .... H04N 7/183; H04N 5/265; H04N 5/23238; H04N 5/262; B64F 5/00; G06T 1/0007; G06T 1/00; G09B 19/0069
See application file for complete search history.

(56) References Cited

U.S. PATENT DOCUMENTS

| 2005/0046729 A1 | 3/2005 | Taguchi et al. |
| 2013/0286174 A1 | 10/2013 | Urakabe |

(Continued)

FOREIGN PATENT DOCUMENTS

| FR | 3056966 A1 | 4/2018 |
| JP | 2011-96116 A | 5/2011 |

(Continued)

OTHER PUBLICATIONS

Japanese Office Action, issued in Japanese Patent Application No. 2018-167948, dated Dec. 3, 2019.

(Continued)

*Primary Examiner* — Tracy Y. Li
(74) *Attorney, Agent, or Firm* — Birch, Stewart, Kolasch & Birch, LLP

(57) ABSTRACT

A system and a method are provided that prevent a wrong panel of a structure such as an aircraft from being opened for inspection of an interior of the structure. A system includes a computer, a portable terminal and a camera configured to capture an image of a structure with panels attached to generate a first image and capture another image of the structure with a predetermined panel among the panels removed to generate a second image and configured to send the first image and the second image to the computer. The computer combines the first image and the second image to generate a third image and sends the third image to the portable terminal. The portable terminal displays the third image. In the third image, the predetermined panel is translucently shown with at least one component at an interior of the predetermined panel being seen through.

4 Claims, 5 Drawing Sheets

(56) References Cited

U.S. PATENT DOCUMENTS

| | | | |
|---|---|---|---|
| 2015/0016746 A1* | 1/2015 | Tsubota | G06T 3/00 |
| | | | 382/275 |
| 2015/0369909 A1* | 12/2015 | Lasser | G01S 15/8925 |
| | | | 367/7 |
| 2016/0019212 A1 | 1/2016 | Soldani | |
| 2016/0041392 A1 | 2/2016 | Sundquist | |
| 2017/0201672 A1 | 7/2017 | Hayashi et al. | |
| 2019/0104253 A1* | 4/2019 | Kawai | G06T 3/4038 |

FOREIGN PATENT DOCUMENTS

| | | |
|---|---|---|
| JP | 2016-218615 A | 12/2016 |
| WO | WO 2016/038976 A1 | 3/2016 |
| WO | WO 2018/155704 A1 | 8/2018 |

OTHER PUBLICATIONS

Anonymouos: "Durchsichtige Motorhaube mein erster Versuch,", Nov. 18, 2014, pp. 1-8, https://www.hondapower.de/forum/.

Anonymous: "Transparente Motorhaube erstellen—Juergens-Workshops.de", May 1, 2016. https://juergens-workshops.de/?show=tutorial&thema=photoimpact5@work=motorhaube.

Extended European Search Report dated Jan. 24, 2020 for corresponding European Application No. 19195602.8.

Japanese Decision to Grant a Patent, dated Mar. 30, 2020, for corresponding Japanese Application No. 2018-167948, with an English translation.

* cited by examiner

SYSTEM AND METHOD FOR INSPECTING INTERIOR OF STRUCTURE

BACKGROUND OF THE DISCLOSURE

Field of the Disclosure

The present disclosure relates to a system and a method for inspecting an interior of a structure that cannot be seen from outside the structure, and particularly relates to a system and a method for assisting in maintaining a structure such as an aircraft.

Description of the Related Art

A fuselage of an aircraft as shown in FIG. 1 has an exterior fully covered with many of panels. At the present, when opening a panel to maintain at least one component, an aircraft mechanic refers to a maintenance manual to identify which panel the component is located inside. However, since many of the panels are similar, it is often impossible to accurately identify the panel inside of which the desired component is located even when the maintenance manual is referred to. For instance, although the desired component is located at the inside of a panel B2, an adjacent panel B1 is sometimes opened by mistake. It should be noted that reference signs A1, B1 . . . are shown in FIG. 1 merely for the purpose of explanation and such reference signs are not shown on panels of a fuselage of an actual aircraft.

Since it takes several tens of minutes to open and close the panel, opening the wrong panel results lengthened maintenance time.

For instance, Japanese Patent Application Laid-Open No. 2011-96116 suggests, as a technology for improving the maintenance efficiency of aircraft, an aircraft maintenance assistance system including an information terminal device to be carried by an aircraft mechanic and an information management device capable of transmission to and reception from the information terminal device.

However, Japanese Patent Application Laid-Open No. 2011-96116 fails to disclose a technology that prevents a wrong panel from being opened.

SUMMARY OF THE DISCLOSURE

The present disclosure is related to providing a system and a method that prevent a wrong panel of a structure such as an aircraft from being opened during inspection of the interior of a structure.

A system includes:
a computer;
a portable terminal that is to be connected to the computer; and
a camera configured to capture an image of a structure with panels being attached to generate a first image and capture another image of the structure with a predetermined panel among the panels being removed to generate a second image and configured to send the first image and the second image to the computer, in which
the computer is configured to combine the first image and the second image to generate a third image and is configured to send the third image to the portable terminal,
the portable terminal is configured to display the third image, and
in the third image, the predetermined panel is translucently shown with at least one component at an interior of the predetermined panel being seen through.

It is preferable that the camera be a 360-degree camera.
It is preferable that the structure be a fuselage of an aircraft.

A method includes:
By means of a camera, capturing an image of a structure with panels attached to generate a first image, capturing another image of the structure with a predetermined panel among the panels removed to generate a second image, and sending the first image and the second image to a computer;
combining the first image and the second image by means of the computer to generate a third image and sending the third image to a portable terminal; and
displaying the third image on the portable terminal, in which
in the third image, the predetermined panel is translucently shown with at least one component at an interior of the predetermined panel being seen through.

DETAILED DESCRIPTION OF THE PREFERRED EMBODIMENT

Figure 1:
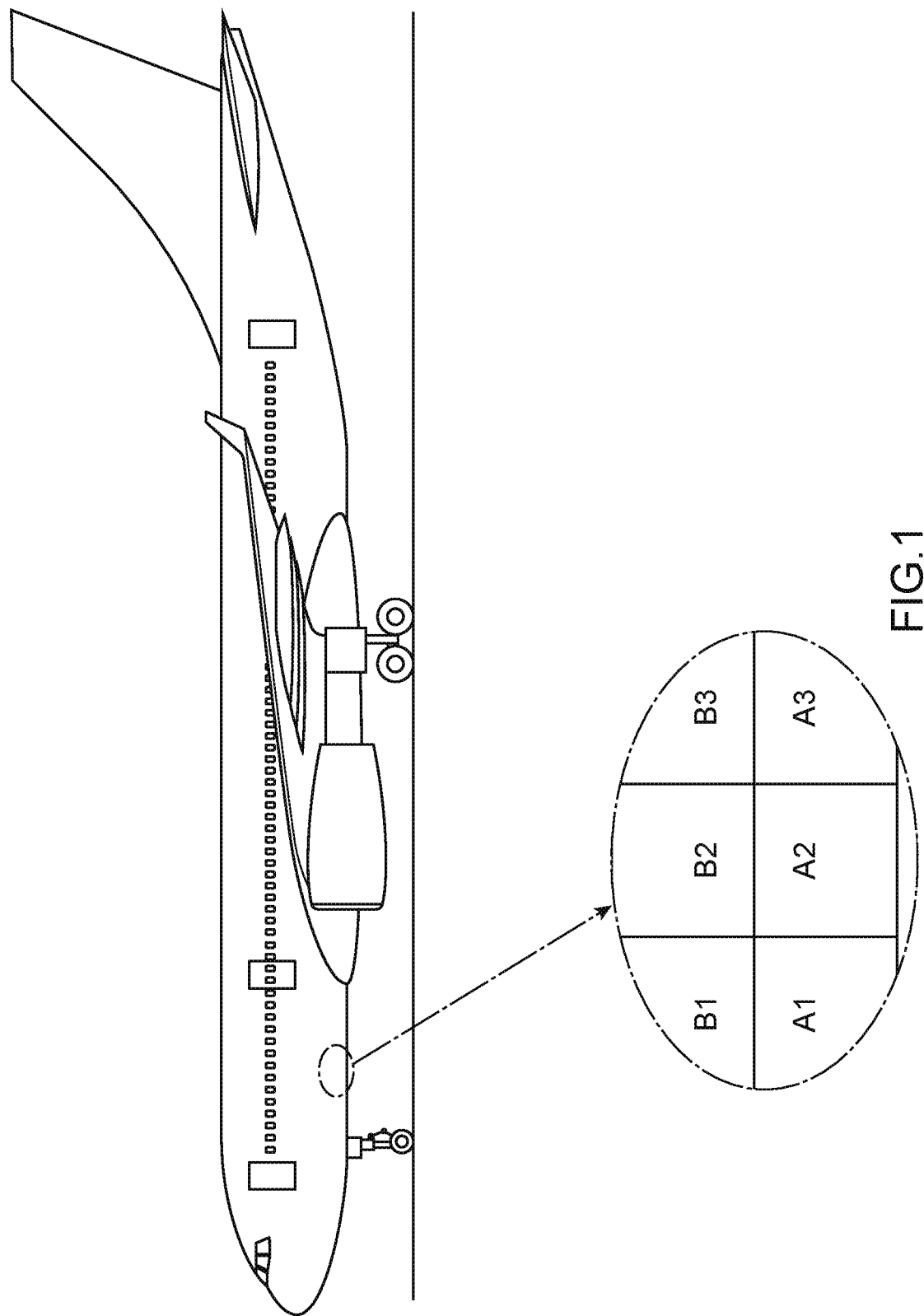
FIG. 1 shows panels of a fuselage of an aircraft.
Figure 2:
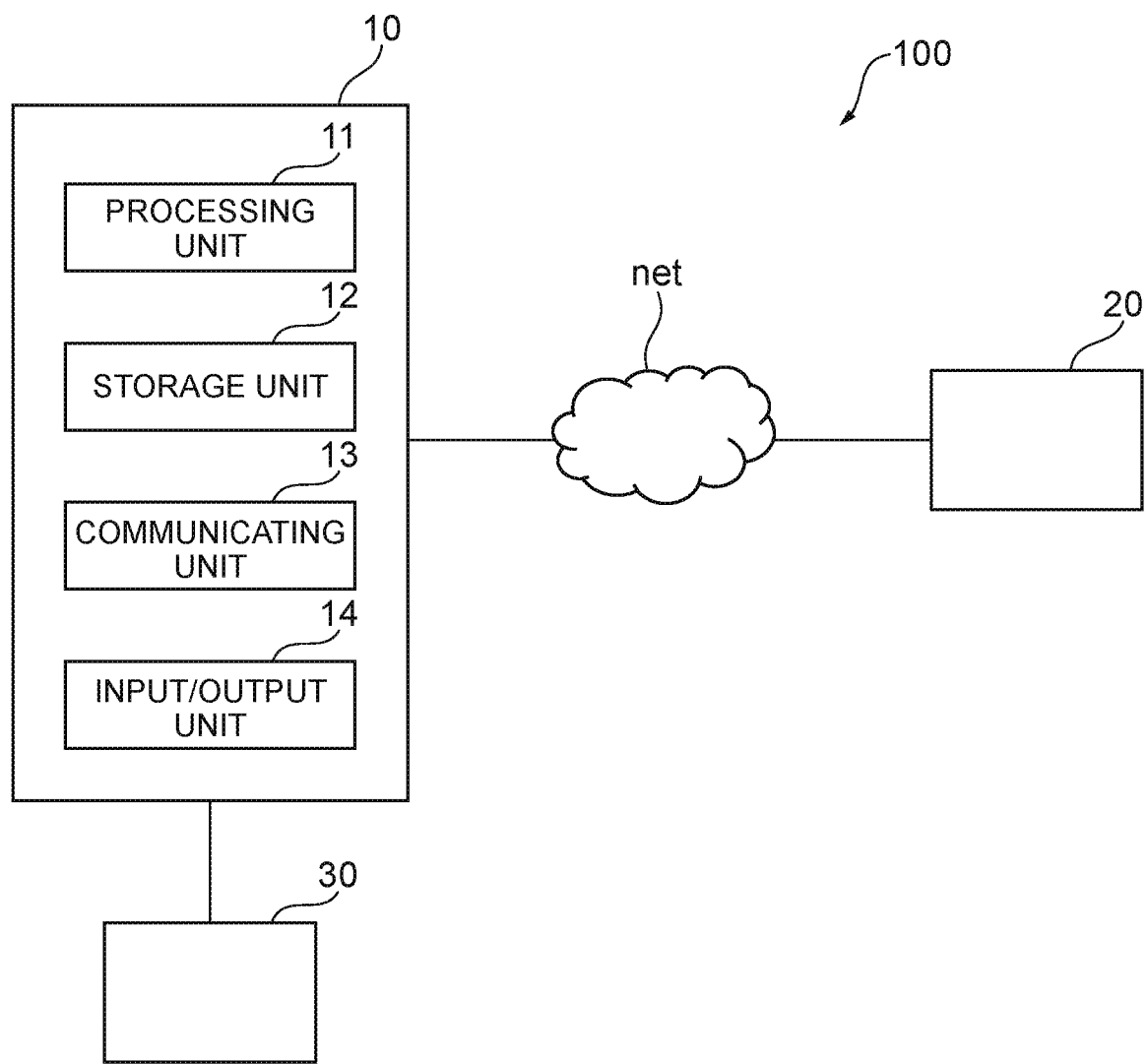
FIG. 2 shows a configuration of a system according to the present disclosure.

FIG. 2 shows a configuration of a system according to the present disclosure.

A system 100 includes a computer 10, a portable terminal 20 that is to be connected to the computer 10, and a camera 30 that captures an image of a structure such as an aircraft and sends the captured image to the computer 10.

The computer 10, which may be a server, a personal computer and the like, includes a processing unit 11 such as a CPU, a storage unit 12 such as a semiconductor memory, a communicating unit 13 such as a network interface, and an input/output unit 14 such as a keyboard or a display.

The portable terminal 20, examples of which include a mobile phone, smartphone, PDA, VR goggles, and personal computer, is to be carried by an aircraft mechanic during maintenance.

The camera 30 is any digital camera. However, it is preferable that the camera 30 be a 360-degree camera or any other wide-angle camera (e.g., fisheye camera), since such cameras can capture a 360-degree image around a structure as an object.

The computer 10 and the portable terminal 20 are connected to each other through a network net such as the Internet in FIG. 2 but may be connected through USB or the like.

In addition, the computer 10, the portable terminal 20, and the camera 30 may be independent of each other as shown in FIG. 2 or may be integral with each other.

Figure 3A:
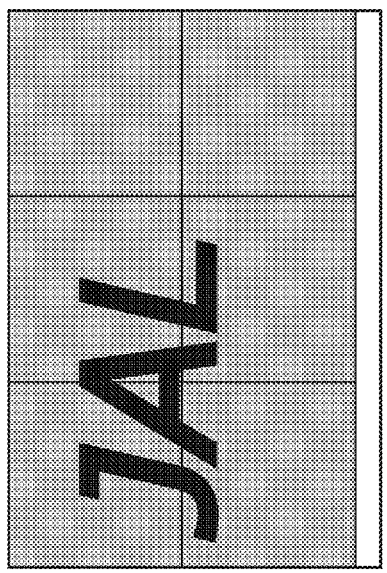
FIGS. 3A to 3C are each an illustration for explaining generation of an image by a system according to the present disclosure.
Figure 3B:
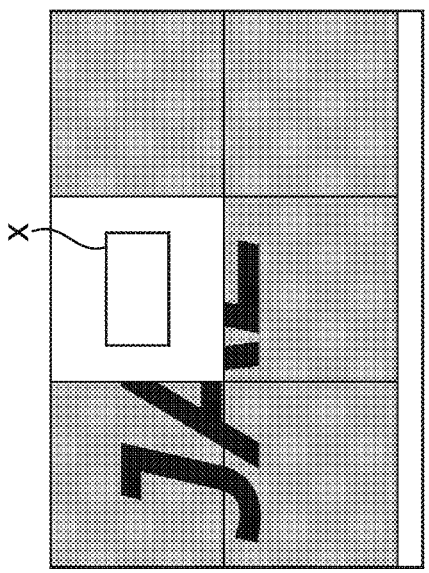
Figure 3C:
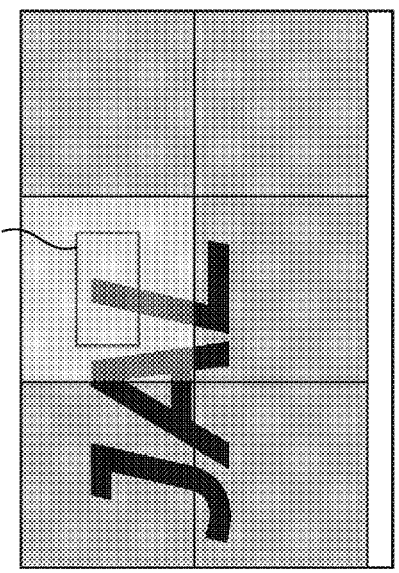

Referring to FIGS. 3A to 3C, generation of an image by the system according to the present disclosure will be described.

FIG. 3A shows a first image captured by the camera 30, the first image being captured with panels being attached to a fuselage of an aircraft. Although the first image shows four panels upon which "JAL" is painted and two plain panels for the purpose of explanation, the first image may show a desired number of panels, such as panels located at desired portions of the fuselage of the aircraft.

FIG. 3B shows a second image captured at the same position as the first image (captured at a fixed point) by the camera 30, the second image being captured with a single panel at upper center being removed. A component x (e.g., actuator) to be inspected (to be maintained) is present interior of the single panel at the upper center and the component x is shown in the second image.

The camera 30 sends the first image and the second image to the computer 10 by wired or wireless communications or, alternatively, through a memory card or the like.

The processing unit 11 of the computer 10 combines (superimposes) the first image and the second image, generating a third image shown in FIG. 3C. In the third image, the five panels other than the panel at the upper center are shown in the same manner as in the first image and the second image, while the single panel at the upper center is translucently shown. In other words, as a result of combining the first image and the second image, the single panel at the upper center is shown with characters (a part of AL) on the visible panel while the component x at the interior of the panel is seen through.

It should be noted that a known technology may be used as a technology for combining the first image and the second image, that is, a technology enabling the first image and the second image to be superimposed upon the single panel at the upper center being translucently shown.

The computer 10 causes the communicating unit 13 to send the third image to the portable terminal 20.

The portable terminal 20 displays the third image, allowing the aircraft mechanic to readily identify the panel interior of which the component x is present with reference to the third image.

It should be noted that in the third image, in the entire fuselage of the aircraft, the panels located at the interior of which components y, z . . . (not shown) to be inspected are present are translucently shown in addition to the component x, while the panels located at the interior of which none of the components to be inspected is present are shown as they are (i.e., neither transparently nor translucently).

Figure 4A:
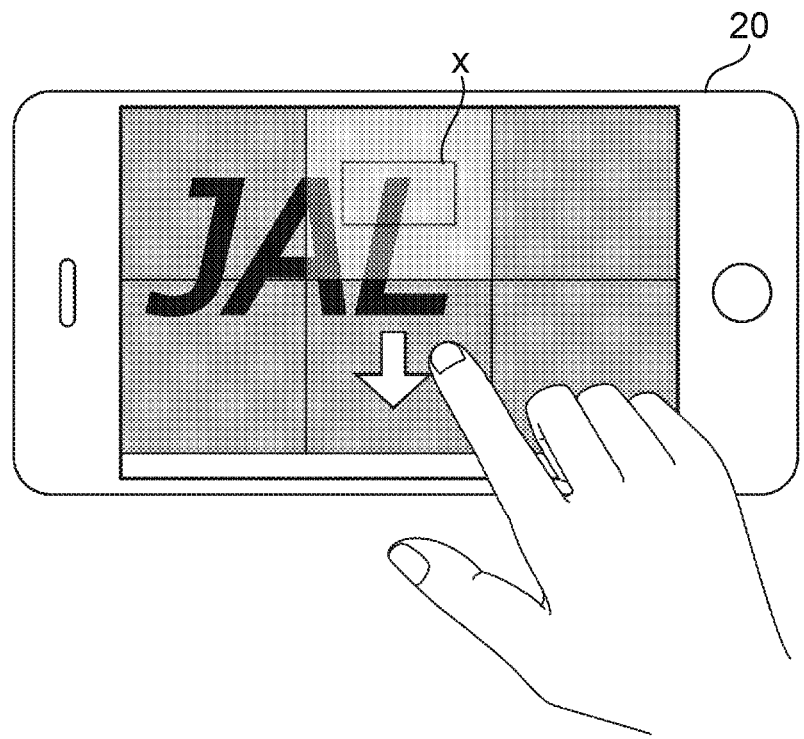
FIGS. 4A and 4B each show the state of a portable terminal on which a third image is displayed.
Figure 4B:
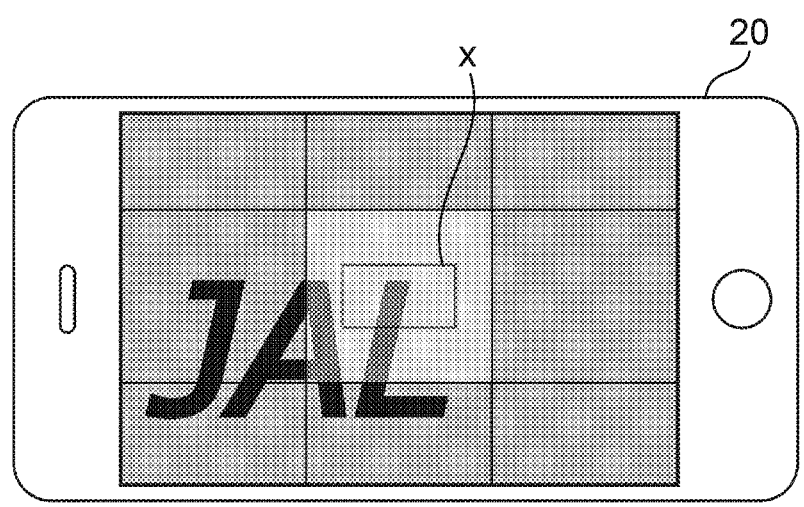

FIGS. 4A and 4B each show the state of a smartphone, or the portable terminal, on which the third image is displayed.

By swiping in an arrow direction on a touch panel of the portable terminal 20 as shown in FIG. 4A, the aircraft mechanic can cause the component x to be displayed at the center as shown in FIG. 4B. In addition, by pinching out and pinching in on the touch panel of the portable terminal 20, the aircraft mechanic can scale the component x up and down.

The aircraft mechanic can thus move the third image by means of his/her fingers as desired.

Since it is possible to operate the portable terminal 20 in front of the fuselage of the actual aircraft while looking at the fuselage of the aircraft, the aircraft mechanic can readily match the desired panel of the fuselage of the aircraft and the corresponding panel shown in the third image displayed on the portable terminal 20.

Figure 5A:
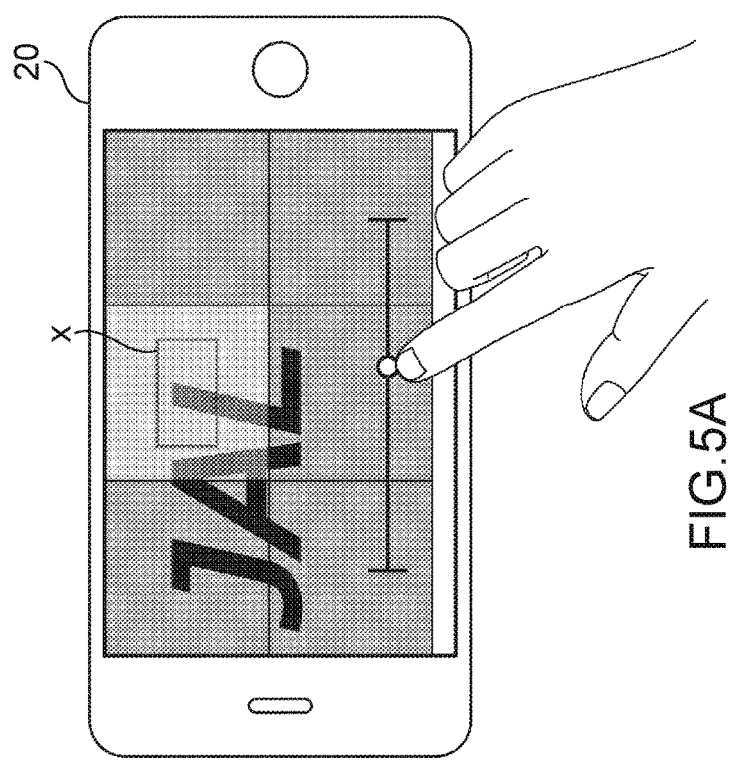
FIGS. 5A and 5B each show in the third image a variation in a transmittance of a panel located at the outside of at least one component to be inspected.
Figure 5B:
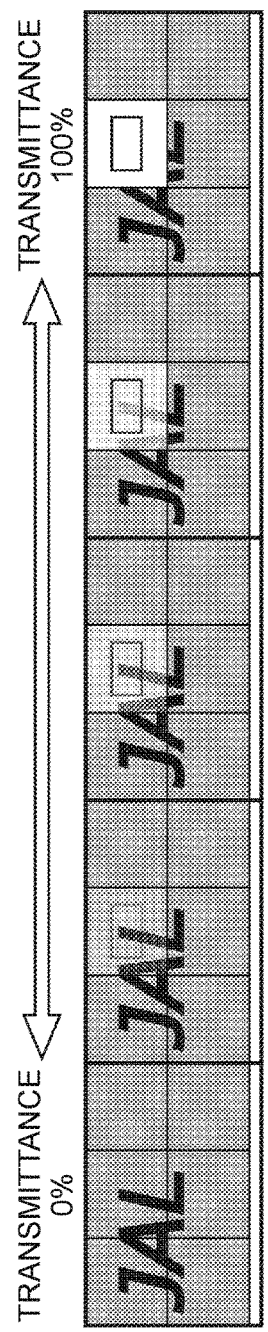

FIGS. 5A and 5B each show a variation in a transmittance of the panel located at the outside of the component x to be inspected in the third image.

By sliding a slide bar displayed in the third image right and left as shown in FIG. 5A, the aircraft mechanic can change the transmittance of the panel at the outside of the component x to be inspected as desired as shown in FIG. 5B.

In addition, by tapping the component x on the third image, the aircraft mechanic can also cause information about the component x, such as maintenance manual and a malfunction case that previously resulted in maintenance of the component x, to be displayed.

The third image may be displayed through an application in the portable terminal 20 or, alternatively, displayed through a web browser. The aircraft mechanic may download the third image from the computer 10 to the portable terminal 20 in accordance with the type of aircraft to be inspected during maintenance or, alternatively, the third image may be stored in the portable terminal 20 in advance.

In the above embodiment, the description is made of the example where the present disclosure is applied to the panels at the outside of the fuselage of the aircraft, but the present disclosure may be applied to panels at the interior of the fuselage of the aircraft, i.e., panels of a wall, ceiling, or floor in a cabin.

Further, in the above embodiment, the description is made of the example where the structure is the fuselage of the aircraft, but the structure is not limited to the fuselage of the aircraft. The present disclosure may be applied to any structure where at least one component is covered with a panel and cannot be seen from the outside, such as ships, trains, and plants.

Further, in the above embodiment, it is described that the system and method according to the present disclosure are intended to be used by the aircraft mechanic during maintenance, but the system and method according to the present disclosure may be usable for any application purpose different from maintenance, such as during a design or development phase.

What is claimed is:

1. A system comprising:
    a computer;
    a portable terminal that is to be connected to the computer, wherein the portable terminal includes a mobile phone, smartphone, PDA, VR goggles, or personal computer, and the portable terminal is to be carried by an operator; and
    a camera configured to capture an image of a structure with panels attached to generate a first image and capture another image of the structure with a predetermined panel among the panels removed to generate a second image and configured to send the first image and the second image to the computer, wherein
    the second image is captured at the same position as the first image by the camera,
    the computer is configured to combine the first image and the second image to generate a third image and is configured to send the third image to the portable terminal,
    the portable terminal is configured to display the third image, and
    in the third image, the predetermined panel is translucently shown with at least one component at an interior of the predetermined panel being seen through by changing a transmittance of the predetermined panel.

2. The system according to claim 1, wherein the camera is a 360-degree camera.

3. The system according to claim 1, wherein the structure is a fuselage of an aircraft.

4. A method comprising:
    by means of a camera, capturing an image of a structure with panels attached to generate a first image, capturing another image of the structure with a predetermined panel among the panels removed to generate a second image, and sending the first image and the second image to a computer, the second image being captured at the same position as the first image by the camera;
combining the first image and the second image by means of the computer to generate a third image and sending the third image to a portable terminal, wherein the portable terminal includes a mobile phone, smartphone, PDA, VR goggles, or personal computer, and the portable terminal is to be carried by an operator; and
displaying the third image on the portable terminal, wherein
in the third image, the predetermined panel is translucently shown with at least one component at an interior of the predetermined panel being seen through by changing a transmittance of the predetermined panel.

\* \* \* \* \*